United States Patent [19]

Lark

[11] Patent Number: 4,997,862

[45] Date of Patent: * Mar. 5, 1991

[54] COLLOIDAL COMPOSITION AND METHOD OF PREPARING SAME

[76] Inventor: John C. Lark, P.O. Box 321, Eden, N.C. 27288

[*] Notice: The portion of the term of this patent subsequent to Mar. 1, 2005 has been disclaimed.

[21] Appl. No.: 161,912

[22] Filed: Feb. 29, 1988

Related U.S. Application Data

[63] Continuation-in-part of Ser. No. 824,437, Jan. 31, 1986, Pat. No. 4,728,679.

[51] Int. Cl.$^5$ .......................... C08K 9/12; D02G 3/00; B32B 7/02
[52] U.S. Cl. ..................................... 523/210; 524/47; 524/51; 524/492; 427/213.3; 427/220; 428/365
[58] Field of Search ................... 523/210; 524/47, 51, 524/492; 427/213.3, 220; 428/365

[56] References Cited

U.S. PATENT DOCUMENTS 4,421,660 12/1983 Solc nee Hajna .................. 523/300
4,728,679 3/1988 Lark ...................................... 524/47

Primary Examiner—Nathan M. Nutter
Attorney, Agent, or Firm—Shefte, Pinckney & Sawyer

[57] ABSTRACT

Preparing a composition by mixing colloidal particles selected from the group consisting of silica, tin oxide and antimony pentoxide with a polyester resin in an aqueous medium with proper neutralization to substantially encapsulate the particles in the resin. The solids ratio of particles to resin is in the range of approximately 1 to 7-10. The resulting product with encapsulated particles can be used as a textile sizing in the case of silica, or as a catalyst as in the case of tin oxide and antimony pentoxide.

5 Claims, No Drawings

COLLOIDAL COMPOSITION AND METHOD OF PREPARING SAME

This is a continuation-in-part of my co-pending U.S. patent application Ser. No. 824,437, filed Jan. 31, 1986 and now U.S. Pat. No. 4,728,679, for A SIZING COMPOSITION, METHOD OF PREPARING SAME AND FIBROUS MATERIAL SIZED WITH SAME.

BACKGROUND OF THE INVENTION

The present invention relates to colloidal compositions and methods of preparing colloidal compositions, and more particularly to such a composition and method wherein the composition is a complex of colloidal particles selected from the group of silica, tin oxide and antimony pentoxide, and a polymeric resin in an aqueous medium.

Colloidal compositions have varied uses, for example, a colloidal composition of silica has use as a textile sizing composition as described and claimed in my aforesaid co-pending U.S. patent application Ser. No. 824,437, and colloidal compositions of tin oxide and antimony pentoxide have use as catalysts. In the case of silica, it is advantageous that the silica particles be deposited individually on the textile substrate rather than in agglomerate form as explained in the aforesaid co-pending application, and in the case of tin oxide and antimony pentoxide as catalysts it is advantageous that the particles be dispersed as individual particles rather than as agglomerates because the efficiency of catalyst particles is directly proportional to the total surface area of the particles.

In the prior art there has been no practical method and resulting composition that provides particle encapsulation of such materials as silica, tin oxide and antimony pentoxide in a supporting medium for efficient utilization of the material for the purposes indicated.

SUMMARY OF THE INVENTION

By the present invention, a method and resulting composition are provided wherein particles of silica, tin oxide and antimony pentoxide are substantially encapsulated in a polymeric resin without significant agglomeration of the particles.

According to the method of the present invention, a composition is prepared by mixing colloidal particles selected from the group consisting of silica, tin oxide and antimony pentoxide with polymeric resin in an aqueous medium to substantially encapsulate the particles in the resin. Preferably, the mixing of the particles to the resin is in a solid ratio of particles to resin in the range of approximately 1 part colloidal particles to 7-10 parts polyester resin. In the case of silica particles, the preferred ratio is in the range of approximately 3 to 25. In the case of tin oxide, the preferred ratio is in the range of approximately 1 to 10. In the case of antimony pentoxide, the ratio is preferably in the range of approximately 3 to 25. In the preferred embodiment the polymeric resin is a polyester resin.

The colloidal composition of the present invention is a complex of colloidal particles selected from the group of silica, tin oxide and antimony pentoxide, and polymeric resin in an aqueous medium, with the particles being substantially encapsulated in said resin. Preferably the solids ratio of particles to resin is in the range of approximately 1 part colloidal particles to 7-10 parts polyester resin, with the preferred solid ratio for silica being 3 to 25, for tin oxide being 1 to 10, and for antimony pentoxide being 3 to 25. In the preferred embodiment the polymeric resin is a polyester resin.

DETAILED DESCRIPTION OF THE PREFERRED EMBODIMENTS OF THE PRESENT INVENTION

The encapsulation obtained by the present invention is particularly applicable to silica, tin oxide and antimony pentoxide. In the case of colloidal silica particles encapsulated in polymeric resin, the composition is used for sizing or otherwise treating fibrous materials, such as textiles. In the case of tin oxide and antimony pentoxide, the encapsulated colloidal particles are used principally as catalysts, such as in flame retardants when used with halogenated materials.

In each of the following examples, the polymeric resin used is a polyester resin of theoretical intermediate number average molecular weight (3,000–7,000) prepared from isophthalic acid, diethylene glycol and trimellitic anhydride as described in Lark U.S. Pat. No. 4,268,645 and conventionally neutralized with an amine containing material (monoisopropylamine or N-methylethanolamine) having an acid number of at least 35 to render it reducable into water.

It should be understood that different molecular weight resins can also be used, for example a lower molecular weight, possibly as low as 1,500, may provide adequate results.

In each of the following examples, the colloidal particles are anionic in nature and are stabilized with an alkali metal ion or amine based cation.

EXAMPLE I

In a laboratory experiment 10 grams of an aqueous dispersion containing 30% of 20 nanometer silica particles were mixed with 100 grams of the polyester in a 25% aqueous dispersion.

The resulting composition was subjected to heat, which initially resulted in encapsulation to produce the product. The fact of encapsulation was established by continued heating until the polyester was burned off, with the residue being in the form of a high-bulk, low density powder residue of substantially individual particles rather than evidencing agglomeration granules.

EXAMPLE II

In a laboratory experiment 10 grams of an aqueous dispersion containing 50% of 100 nanometer silica particles were mixed with 40 grams of the polyester in a 25% aqueous dispersion.

The resulting composition was subjected to heat, which initially resulted in encapsulation to produce the product. The fact of encapsulation was established by continued heating until the polyester was burned off, with the residue being in the form of a high-bulk, low density powder residue of substantially individual particles rather than evidencing agglomeration granules.

EXAMPLE III

The experiment of Example I above was carried out using 30 nanometer tin oxide particles in a 25% aqueous dispersion mixed with 100 grams of the aforesaid polyester resin in a 25% aqueous dispersion.

Upon initial heating the tin oxide was encapsulated in the resin, which was indicated by continued heating sufficient to burn off the polyester, resulting in a high-bulk, low density, white powder residue rather than agglomerated granules.

EXAMPLE IV

The experiment of Example I above was carried out using 30 nanometer antimony pentoxide particles in a 30% aqueous dispersion mixed with 100 grams of the aforesaid polyester resin in a 25% aqueous dispersion.

Upon initial heating the antimony pentoxide was encapsulated in the resin, which was indicated by continued heating sufficient to burn off the polyester, resulting in a high-bulk, low density, yellow powder residue rather than agglomerated granules.

The present invention may be practiced by forming the composition before its use application, by preparing the complex as a dry powder for in situ application or by forming the composition in situ during an application operation.

It is contemplated that the resin used in the present invention may be of a molecular weight number average range other than intermediate and may be neutralized with basic nitrogen-containing materials. Further, it is expected that the colloidal particles may be of sizes different than in the foregoing examples, such as in the range of 3 to 150 millimicrons in the case of silica, in the range of 20 to 100 millimicrons in the case of antimony pentoxide, and in a range varying from 30 millimicrons in the case of tin oxide, provided that the result is in the classification of a sol. In addition, it is contemplated that additives, such as alumina may be usable with silica in the colloidal silica sol and other representative materials with tin oxide and antimony pentoxide. Also, as the size of the colloidal particles increases, the ratio of colloidal particles to resin decreases, to as low as 1 to less than 2.

The disclosure in the aforesaid co-pending U.S. patent application Ser. No. 824,437, is incorporated herein by reference, particularly in regard to the application of the present invention to colloidal silica particles.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A colloidal composition comprising a complex formed of colloidal particles selected from the group of silica, tin oxide or antimony pentoxide and polymeric polyester resin in an aqueous medium, with said colloidal particles being substantially encapsulated in said resin, said complex being dryable without substantial agglomeration of said encapsulated colloidal particles.

2. A colloidal composition according to claim 1 and characterized further in that the solids ratio of particles to resin is in the range of approximately 1 to 7-10.

3. A colloidal composition according to claim 1 and characterized further in that said particles are of silica and that the solids ratio of particles to resin is in the range of approximately 3 to 25.

4. A colloidal composition according to claim 1 and characterized further in that said particles are of tin oxide and that the solids ratio of particles to resin is in the range of approximately 1 to 10.

5. A colloidal composition according to claim 1 and characterized further in that said particles are of antimony pentoxide and that the solids ratio of particles to resin is in the range of approximately 3 to 25.

* * * * *